(12) United States Patent
Odaira

(10) Patent No.: US 6,882,629 B2
(45) Date of Patent: Apr. 19, 2005

(54) COMMUNICATION DEVICE, AND METHOD AND PROGRAM FOR CONTROLLING THE SAME

(75) Inventor: Masahiro Odaira, Ibaraki-ken (JP)

(73) Assignee: Canon Kabushiki Kaisha (JP)

( * ) Notice: Subject to any disclaimer, the term of this patent is extended or adjusted under 35 U.S.C. 154(b) by 915 days.

(21) Appl. No.: 09/828,404

(22) Filed: Apr. 6, 2001

(65) Prior Publication Data

US 2001/0028635 A1 Oct. 11, 2001

(30) Foreign Application Priority Data

Apr. 7, 2000 (JP) ........................................ 2000-106333

(51) Int. Cl.⁷ .............................................. H04L 12/66
(52) U.S. Cl. ........................................ 370/252; 370/524
(58) Field of Search .............................. 370/252, 410, 370/469, 522, 524, 352

(56) References Cited

U.S. PATENT DOCUMENTS 4,996,685 A * 2/1991 Farese et al. ............... 370/352
5,208,806 A * 5/1993 Hasegawa .................. 370/352
5,365,517 A * 11/1994 Kato et al. .................. 370/251
6,611,517 B1 * 8/2003 Malik ......................... 370/353

FOREIGN PATENT DOCUMENTS

EP          0 822 731          2/1998

OTHER PUBLICATIONS

ITU–T XP002177693, "Recommendation Q.931," May 1998.
ITU–T XP002177694, "Recommendation Q.921," Sep. 1997.

* cited by examiner

Primary Examiner—Chau Nguyen
Assistant Examiner—Albert T. Chou
(74) Attorney, Agent, or Firm—Morgan & Finnegan, LLP

(57) ABSTRACT

Heretofore, depending on a network (switching device) to be used, call releasing has not been normally finished since a time until data link releasing took a value intrinsic to the device. According to the present invention, the counting of a predetermined time is started depending on determination as to the execution of call releasing. Then, depending on the passage of a predetermined time, the process of releasing a data link is started.

12 Claims, 8 Drawing Sheets

COMMUNICATION DEVICE, AND METHOD AND PROGRAM FOR CONTROLLING THE SAME

BACKGROUND OF THE INVENTION

1. Field of the Invention

The present invention relates to a communication device for carrying out the process of releasing a data link when a call is released, and a method and a program for controlling the communication device.

2. Related Background Art

In the D channel of an integrated services digital network (ISDN), a data link is set in its layer 2, and a network layer is set in its layer 3.

In the control of the layers 3 and 2, when calling or communications are finished, and a release-complete (REL-COMP) message is sent or received to release a call, the layer 3 makes a data link releasing request to the layer 2 by notifying Data Link (DL)-Release-Request, if no other currently used calls are present at a point of this time. Upon having received the DL-Release-Request, the layer 2 sends a disconnect (DISC) command as a data link cutting-off instruction to the network. After the reception of an unnumbered acknowledge (UA) response as a response to the command, the layer 2 outputs DL-Release-Confirmation to the layer 3, thereby notifying the releasing of the data link.

Upon having received the DISC command, an opposite communication side notifies DL-Release-Indication from the layer 2 to the layer 3 to release the data link, and sends the UA response to the network.

In the conventional device, a time from the releasing of a call to the request of data link releasing made by the layer 3 to the layer 2 takes a value intrinsic to the device.

However, depending on a network (switching device) to be used, if the DISK command of the layer 2 was sent without any proper time interval taken after the transmission or reception of the REL-COMP message of the layer 3, the data link releasing process was not finished normally, bringing about the resetting of a data link by the network.

Furthermore, since a permissible value for such a time interval varied from network to network (switching device), it was impossible to normally finish call releasing depending on a device installing place (switching device, to which the device was connected).

SUMMARY OF THE INVENTION

It is an object of the present invention to enable a call to be released normally.

It is another object of the invention to enable the execution of a data link releasing process suitable for a switching device, to which a communication device is connected.

Other objects of the invention will become apparent from the following detailed description and drawings.

DESCRIPTION OF THE PREFERRED EMBODIMENTS

Next, the preferred embodiment of the present invention will be described with reference to the accompanying drawings.

Figure 1:
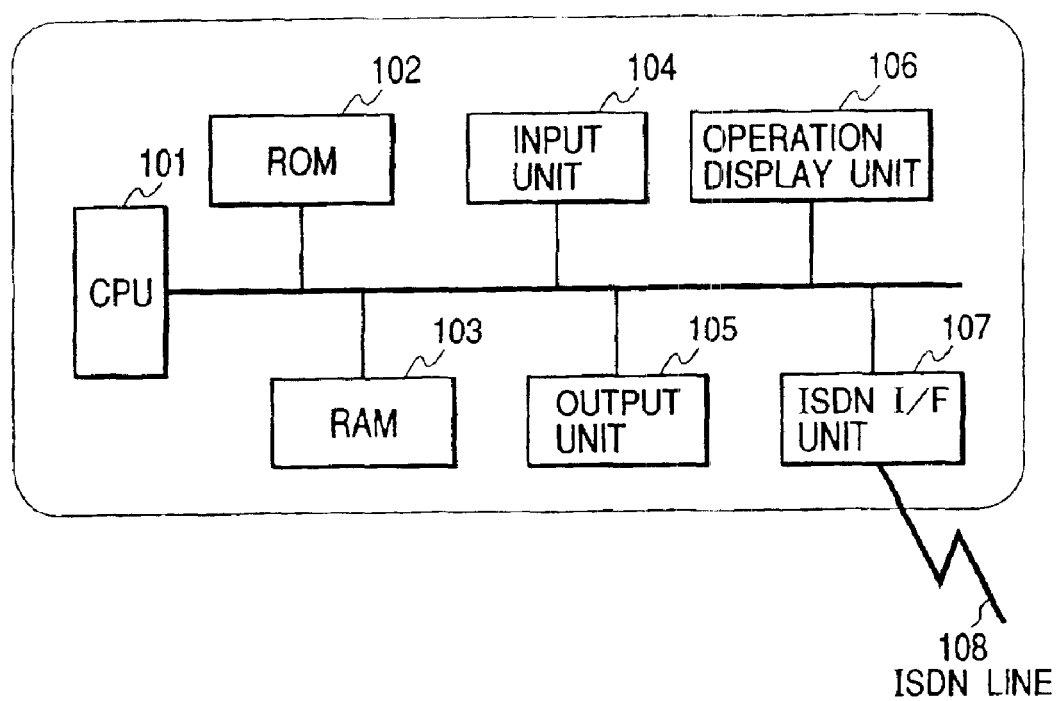
FIG. 1 is a constitutional view of a communication device according to an embodiment of the present invention.

FIG. 1 is a block diagram showing the constitution of a communication device according to an embodiment of the invention.

A CPU 101 is a system control unit in charge of control over the entire device. A ROM 102 stores a control program of the CPU 101. A part of the control program for the CPU 101 is one for carrying out a process described below.

A RAM 103 includes an SRAM, a DRAM or the like, and stores a program control variable or the like. The RAM 1–3 also stores a set value registered by a device user, management data of the device, and a buffer for various works.

In addition, the RAM 103 stores a timer value of the described embodiment. The setting of the timer value is carried out by the device user through key entry from an operation display unit 106. Setting information can be transferred from an external unit to the communication device through a predetermined interface, network or the like, and stored in the RAM 103.

An input unit 104 includes various input devices, e.g., a microphone, a scanner, and so on.

An output unit 105 includes various output devices, e.g., a speaker, a printer, and so on.

The operation display unit 106 includes a keyboard, a touch panel, an LCD, an LED or the like. This unit is used by the device user to perform various operations, and display notification is made to the device user.

An ISDN I/F (interface) unit 107 controls transmission on D and B channels to carry out integrated services digital network (ISDN) communications through an ISDN line 108.

FIGS. 2 to 6 are flowcharts, each showing an example of the operation of the communication device of the embodiment.

The operations shown in FIGS. 2 to 6 are performed by the CPU 101 based on programs stored in the ROM 102 or the RAM 103, and each setting.

Figure 2:
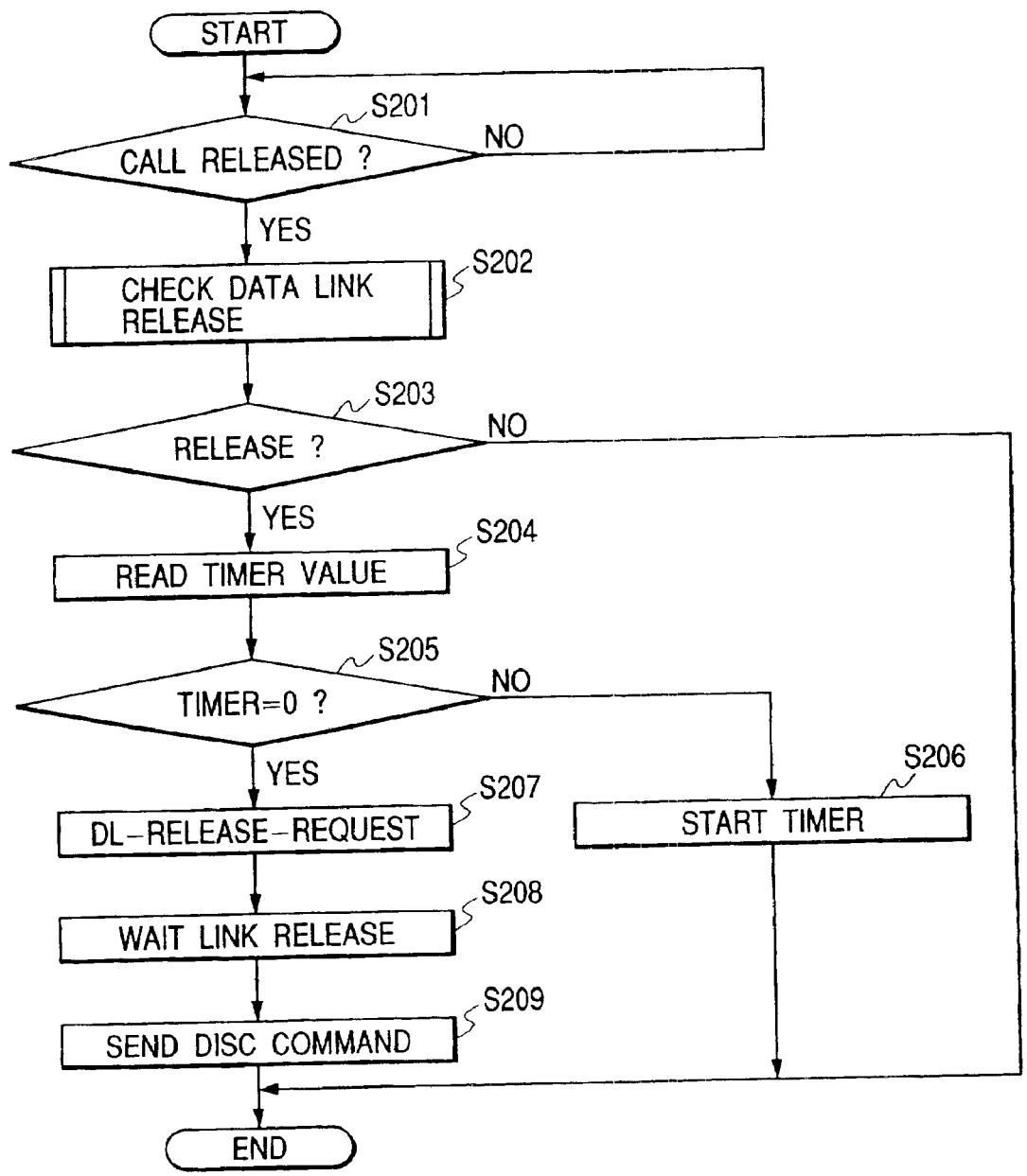
FIG. 2 is a flowchart showing a process of the communication device of the embodiment.

FIG. 2 is a flowchart showing the operation at the time of call releasing.

The CPU 101 determines the end of calling or communications, and the releasing of a call in S201, and then checks on whether a data link is released or not in S202 (details are described later). If it is determined in S203 that the result of the checking in S202 indicates releasing, then the process proceeds to S204. If the result of the checking in S202 indicates otherwise, the process is finished.

Then, in S204, a timer value preset by the key entry of the operation display unit 106 and stored in the RAM 103 is read. As described above, the timer value may be one that has been transferred from the external unit, and stored in the RAM 103. If it is determined in S205 that the timer value is 0, in S207, Data Link (DL)-Release-Request is notified from the layer 3 to the layer 2 to request the releasing of the data link, and a current state is placed on standby for link releasing. Then, in S209, a disconnect (DISC) command is sent to the network. If it is determined in S205 that the timer value is not 0, in S206, the timer of the value read in S204 is started.

Figure 3:
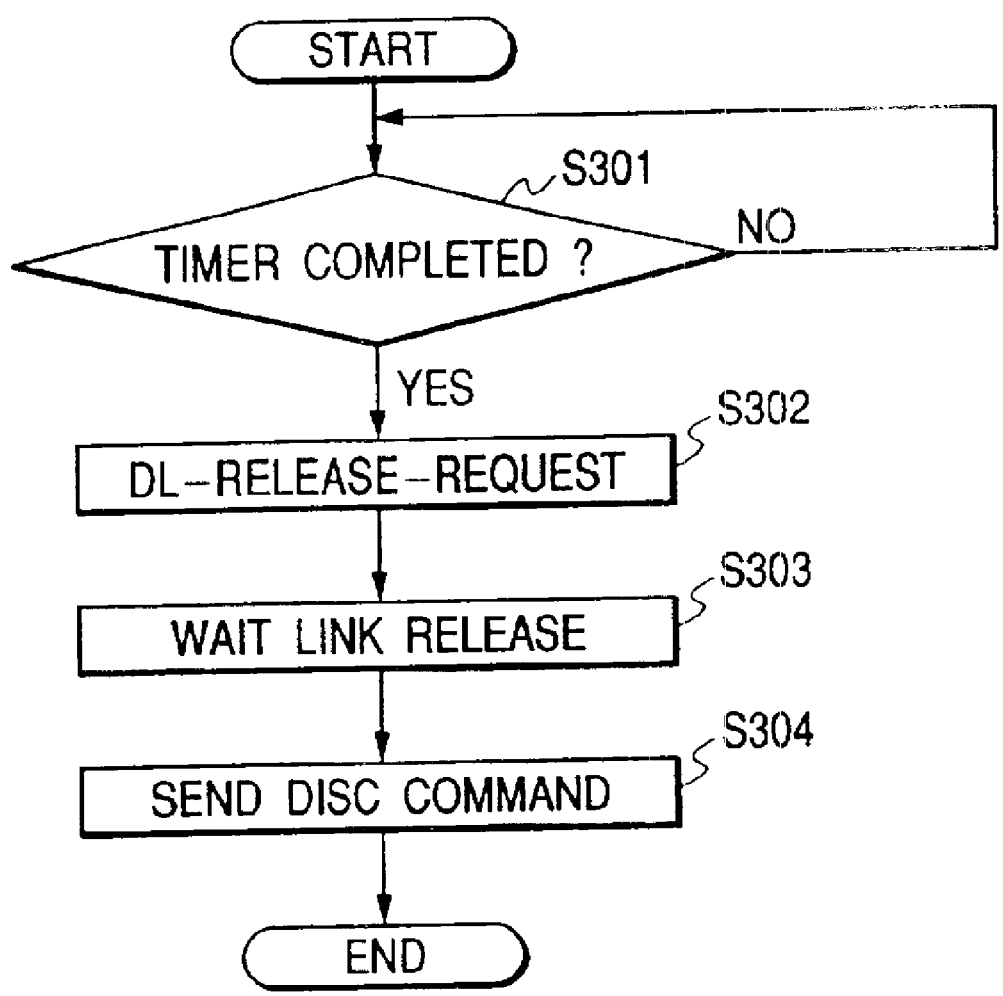
FIG. 3 is a flowchart showing a process of the communication device of the embodiment.

FIG. 3 is a flowchart showing the operation at the time of completion of the timer started in S206 shown in FIG. 2.

After having determined in S301 that the timer has been completed, in S302, the CPU 101 notifies DL-Release-Request from the layer 3 to the layer 2 to request the releasing of the data link. Then, in S303, a current state is placed on standby for link releasing. In S304, a DISC command is sent to the network.

Figure 4:
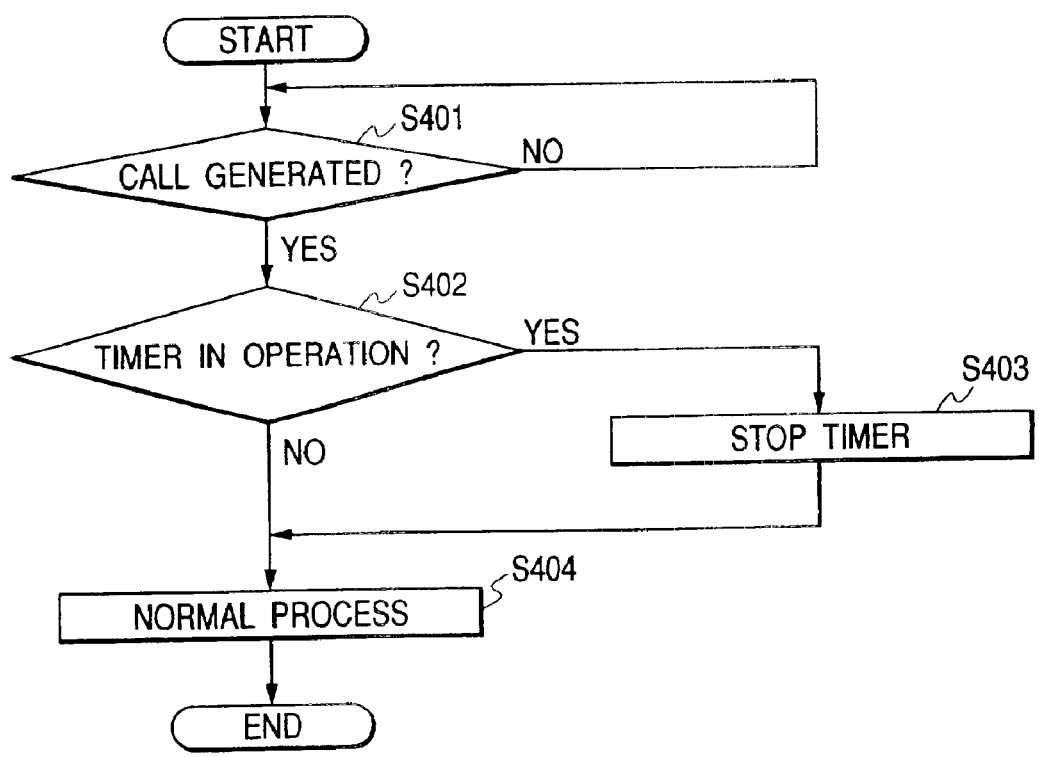
FIG. 4 is a flowchart showing a process of the communication device of the embodiment.

FIG. 4 is a flowchart showing the operation at the time of call generation.

After having determined in S401 that a new call has been generated, in S402, the CPU 101 determines whether the timer started in S206 of FIG. 2 is in operation or not. If the on-going operation of the timer is determine in S402, the timer is stopped in S403, and normal processing at the time of call generation, i.e., processing such as SETUP transmission, or the like for generating a call, is carried out in S404. If the on-going operation of the timer is not determined in S402, then normal processing at the time of call generation is executed in S404.

Figure 5:
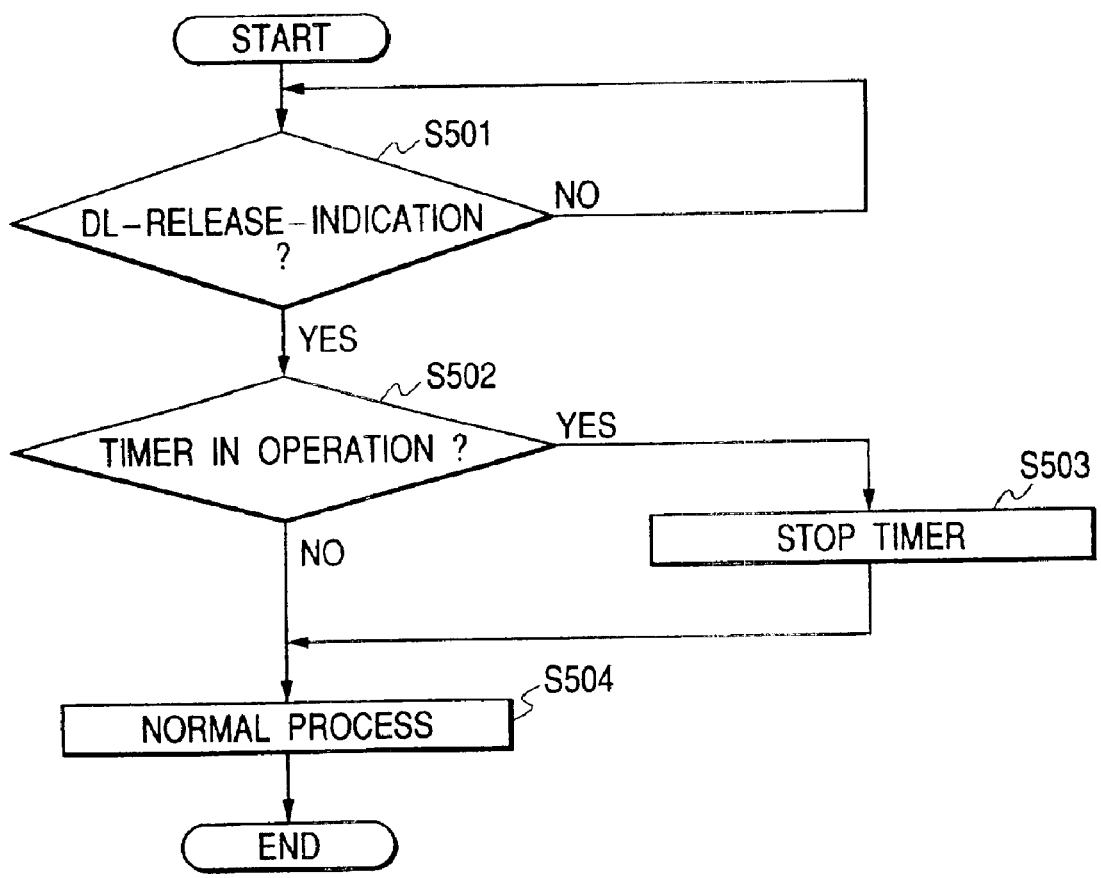
FIG. 5 is a flowchart showing a process of the communication device of the embodiment.

FIG. 5 is a flowchart showing the operation at the time of receiving data link releasing notification.

In S501, the CPU 101 receives a DISC command from the network. Upon having determined that DL-Release-Request has been notified from the layer 3 to the layer 2, and data link releasing notification has been received, in S502, the CPU 101 determines whether the timer is in operation or not. If the on-going operation of the timer is determined in S502, the timer is stopped in S503 and, in S504, normal processing at the time of receiving the data link releasing notification, i.e., processing such as transmission of unnumbered acknowledge (UA) response to the network or the like, is carried out. If the on-going operation of the timer is not determined in S502, then normal processing at the time of receiving the data link releasing notification is executed in S504.

Figure 6:
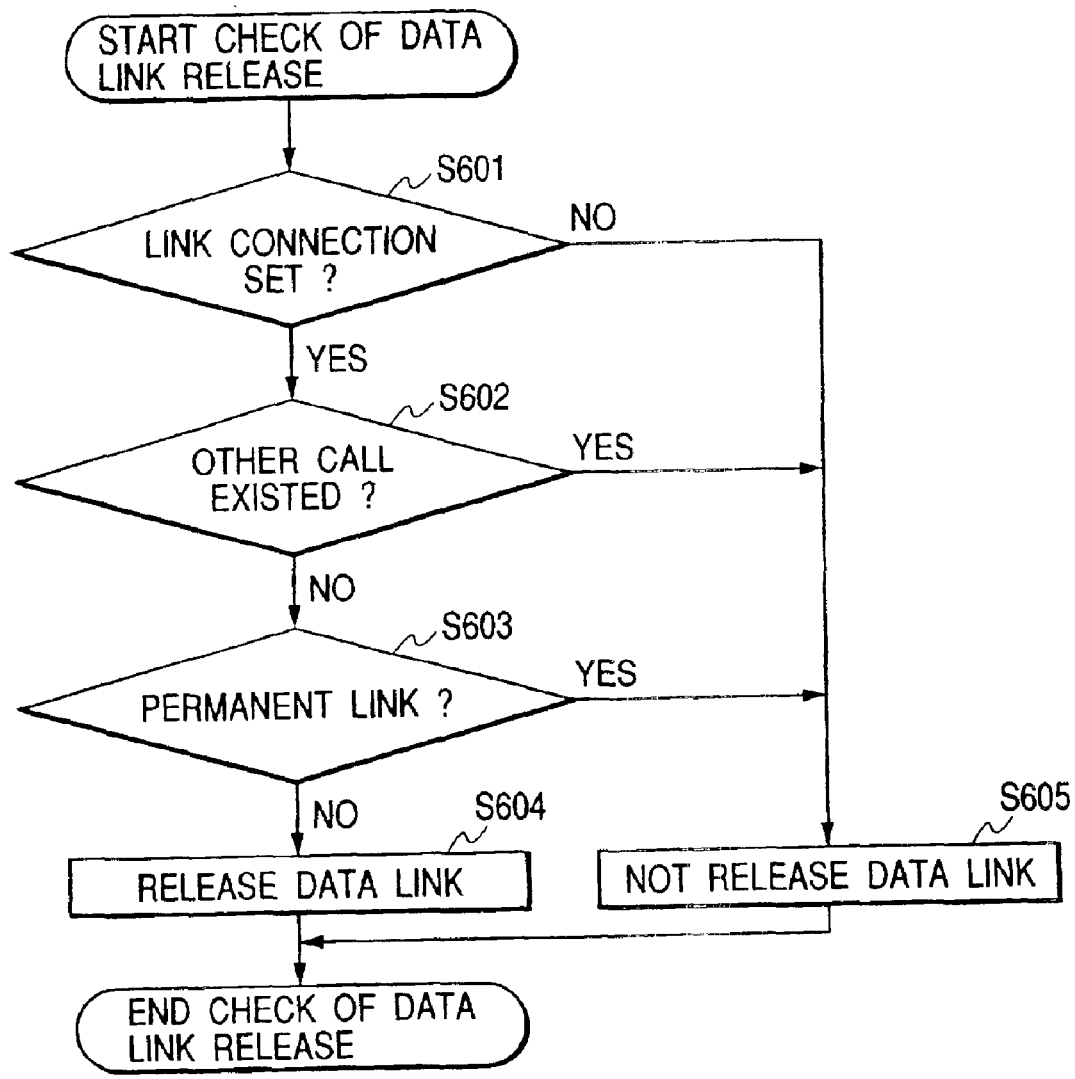
FIG. 6 is a flowchart showing a process of the communication device of the embodiment.

FIG. 6 is a flowchart showing checking on whether the data link is released or not (processing of S202 in FIG. 2).

If it is determined in S601 that a current state is not link connecting setting, it can be understood that the data link has already been set. Accordingly, in S605, non-releasing of the data link is set as the result of the checking.

If it is determined in S602 that there is another call using the line, similarly, non-releasing of the data link is set as the result of the checking in S605.

Similarly, if it is determined in S603 that the terminal is not set for releasing the data link (permanent link setting), in S605, non-releasing of the data link is set as the result of the checking.

Only when it is determined in S601 that a current state is link connection setting, it is determined in S602 that no other calls are present using the line, and it is determined in S603 that setting is not permanent link setting, in S604, releasing of the data link is set as the result of the checking.

Figure 7:
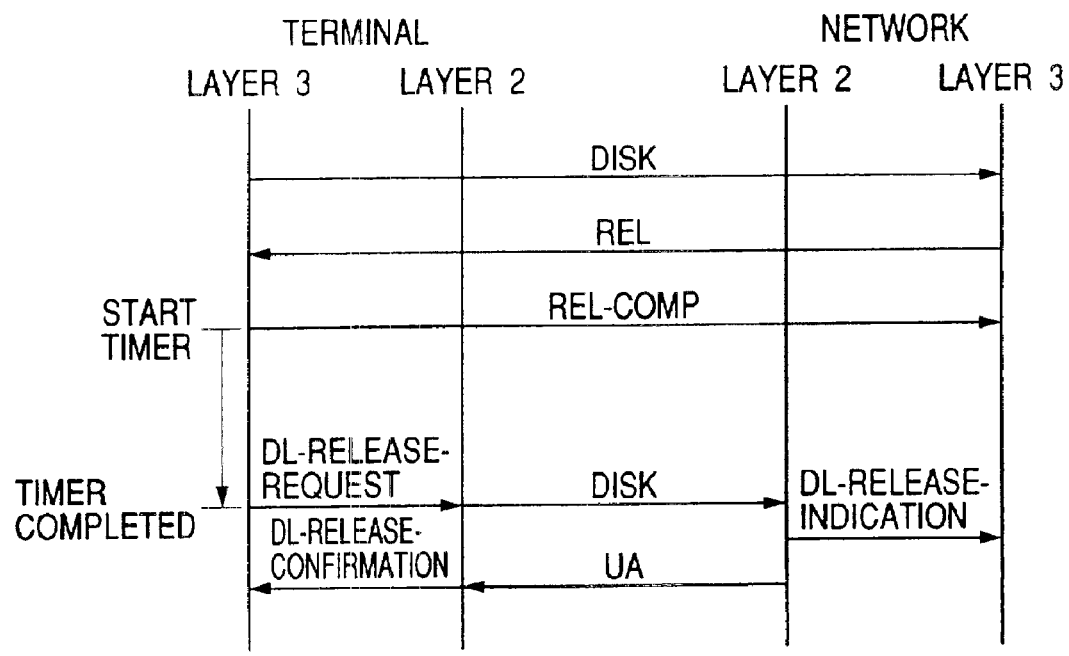
FIG. 7 is a sequential view during a data link releasing process of the embodiment.

FIG. 7 is a view showing an example of a normal sequence of data link releasing. When a call is released by the transmission of a release complete (REL-COMP) message, the determination operations of S601, S602 and S603 in FIG. 6 are executed. If the releasing of the data link is determined as a result, the timer is started. After the completion of the timer, based on the DL-Release-Request from the layer 3, the DISC command is transmitted from the layer 2 to the network. After the reception of the UA response from the network, DL-Release-Conformation is sent to the layer 3 to notify the releasing of the data link.

Figure 8:
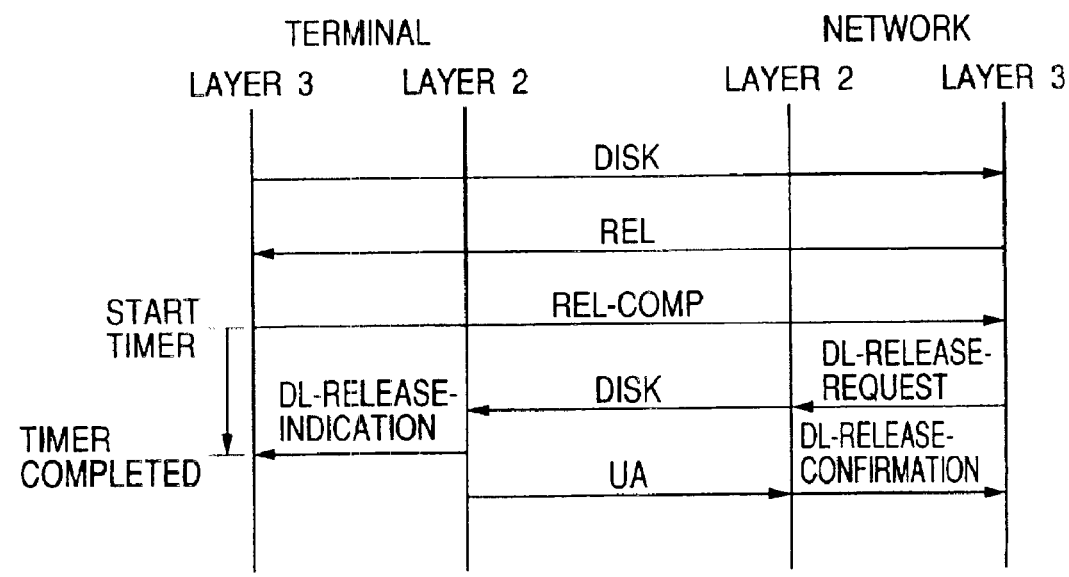
FIG. 8 is a sequential view during a data link releasing process of the embodiment.

FIG. 8 is a view showing an example of a sequence when data link releasing notification is received during the operation of the timer. When the DISC command is received from the network during the operation of the timer, the UA response is sent from the layer 2 to the network. Then, DL-Release-Indication is sent from the layer 2 to the layer 3 to notify the releasing of the data link. After the reception of the data link releasing notification, at the layer 3, the timer is stopped because of the ongoing operation of the timer.

Figure 9:
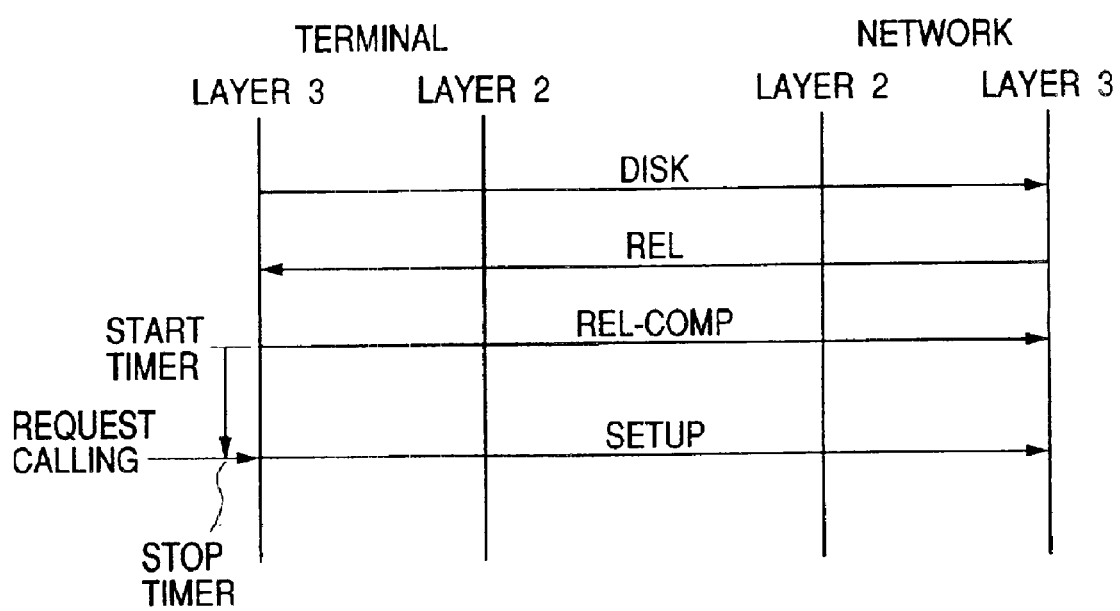
FIG. 9 is a sequential view when there is a calling request at a timer starting time according to the embodiment.

FIG. 9 is a view showing an example of a sequence when a calling request is made during the operation of the timer. When calling is requested during the operation of the timer, at the layer 3, calling is carried out based on a SETUP message. At this time, since the timer is in operation, the timer is stopped.

The foregoing operations are carried out by the CPU 101 based on the programs stored in the ROM 102, the RAM 103, and so on. However, such programs may be stored in various external storage media, e.g., a floppy disk, a hard disk, an optical disk, a magneto-optical disk, a CD-ROM, a memory card, and so on, and executed by the CPU 101.

As can be understood from the foregoing, according to the invention, it is possible to carry out a data link releasing process suitable for the switching device, to which the communication device is connected.

What is claimed is:

1. A communication device comprising:
   determining means for determining whether a data link is released or not when a call is released;
   counting means for counting a predetermined time according to the determination of the determining means; and
   control means for starting a process for releasing the data link according to a passage of the predetermined time.

2. A communication device according to claim 1, wherein the control means sends a data link releasing request from a layer 3 to a layer 2 after the passage of the predetermined time.

3. A communication device according to claim 1, wherein the control means sends a signal for instructing data link releasing through a line after the passage of the predetermined time.

4. A communication device according to claim 1, wherein when a generated call is detected before the predetermined time is counted by the counting means, the counting by the counting means is stopped.

5. A communication device according to claim 1, wherein the predetermined time can be settable.

6. A communication device according to claim 1, wherein when a signal for instructing data link releasing is received through a network before the predetermined time is counted by the counting means, the data link releasing is notified from a layer 2 to a layer 3.

7. A communication device according to claim 1, wherein the determination by the determining means is executed when a signal for notifying completion of call releasing is sent or received.

8. A communication device according to claim 1, wherein the determining means determines that the data link is released if a data link is being set, and determines that the data link is not released if a data link is not being set.

9. A communication device according to claim 1, wherein the determining means determines that the data link is released if no other calls are present, and determines that the data link is not released if another call is present.

10. A communication device according to claim 1, wherein the determining means determines that the data link is released if there is setting to release the data link from a terminal, and determines that the data link is not released if there is setting not to release the data link from the terminal.

11. A control method for a communication device, comprising:

a determining step for determining whether a data link is released or not when a call is released;

a counting step for counting a predetermined time according to the determination by the determining step; and a control step for starting a process for releasing the data link according to a passage of the predetermined time.

12. A program for controlling a communication device, comprising:

a determining step for determining whether a data link is released or not when a call is released;

a counting step for counting a predetermined time according to the determination by the determining step; and a control step for starting a process for releasing the data link according to a passage of the predetermined time.

* * * * *